(12) United States Patent
Davis

(10) Patent No.: US 11,613,085 B2
(45) Date of Patent: Mar. 28, 2023

(54) MULTIPLE WAVELENGTH TEMPERATURE DETECTOR FOR RESISTIVE HEATING PROCESSES

(71) Applicant: Kevin Davis, Guilford, CT (US)

(72) Inventor: Kevin Davis, Guilford, CT (US)

( * ) Notice: Subject to any disclaimer, the term of this patent is extended or adjusted under 35 U.S.C. 154(b) by 323 days.

(21) Appl. No.: 17/017,926

(22) Filed: Sep. 11, 2020

(65) Prior Publication Data

US 2021/0069993 A1    Mar. 11, 2021

Related U.S. Application Data

(60) Provisional application No. 62/898,573, filed on Sep. 11, 2019.

(51) Int. Cl.
| | | |
|---|---|---|
| *B32B 41/00* | (2006.01) | |
| *B29C 65/00* | (2006.01) | |
| *G01J 5/00* | (2022.01) | |
| *G01K 13/00* | (2021.01) | |

(52) U.S. Cl.
CPC ...... *B29C 66/91218* (2013.01); *G01J 5/0018* (2013.01); *B29C 66/91221* (2013.01); *G01K 13/00* (2013.01)

(58) Field of Classification Search
CPC ......... B29C 66/91218; B29C 66/91221; G01J 5/0018; G01J 5/602; G01J 2005/0077; G01J 2005/604; G01K 13/00
USPC .................... 156/60, 64, 350, 351, 378, 379
See application file for complete search history.

(56) References Cited

U.S. PATENT DOCUMENTS

| | | |
|---|---|---|
| 10,024,735 B2 | 7/2018 | Ignatowski et al. |
| 2019/0116328 A1* | 4/2019 | Dock ........................ G01J 5/10 |

* cited by examiner

*Primary Examiner* — Michael N Orlando
*Assistant Examiner* — Joshel Rivera
(74) *Attorney, Agent, or Firm* — Wiggin and Dana LLP

(57) ABSTRACT

A temperature sensing system for a resistive welding process for a tube performs repeatable temperature measurement using a camera to detect multiple distinct visible light wavelengths even as the ambient environment in the view path changes. Sensed colors in a field of view in the vicinity of a weld are output to a computing element that calculates a corresponding temperature and alerts an operator when the sensed color exceeds a preset color range.

13 Claims, 3 Drawing Sheets

MULTIPLE WAVELENGTH TEMPERATURE DETECTOR FOR RESISTIVE HEATING PROCESSES

CROSS-REFERENCE TO RELATED APPLICATION

This application claims priority to provisional application Ser. No. 62/898,573, which was filed Sep. 11, 2019, and whose entire contents are incorporated herein by reference.

TECHNICAL FIELD OF THE DISCLOSURE

This disclosure relies on the characteristics of light at different wavelengths, including absorption, scattering and refraction, as well as the variation in emitted light intensity at different wavelengths across a range of temperatures, to provide a repeatable temperature measurement using a camera detecting multiple distinct wavelengths even as changes occur in the ambient environment in the field of view.

BACKGROUND OF THE DISCLOSURE

The process control of welded product in tube and pipe mills has several problems unique to the welding environment. An operator needs to be able to control the temperature of the weld in order to maximize efficiency and avoid producing lower quality or unusable product. Most tube and pipe mills monitor the weld temperature without using any tools other than the operator's naked eye. The result from this approach is an unreliable temperature measurement and no record of the weld conditions which makes it difficult to identify root cause issues with product and challenging to improve outcomes going forward.

In a tube mill, a continuous strip of material is roll-formed until the edges of the strip come together to form the shape of a tube. This process begins at one end of the strip and progresses continuously to the other. Welding occurs at the point where the strip edges meet. Heating results from an electrical current that is induced in the strip material, either inductively or with contact leads. This current heats the strip edges to a high enough temperature for the two edges to weld and fuse together. This process takes place continuously along the length of the strip as it moves through the mill.

With a well-regulated welder and a uniform material moving through a consistent weld area at a constant speed there would not be a reason to worry about temperature fluctuations in the weld. However, there are other components in the weld area that can introduce a great deal of variance. A good example of this is the impeder. The impeder is a ferrite rod mounted near the welding point that extends into the center of the tube. As previously mentioned, current induced in the strip heats the strip edges for welding. Unfortunately, current that travels in any part of the strip other than the edges is wasted. The impeder plays a crucial role in welder efficiency by increasing the impedance of the current path along the inside of the tube, thereby increasing the current share that will travel along the strip edges.

The location of the impeder, in the center of a quickly moving metal tube heated above 1000 degrees Celsius, makes it prone to fail. Sometimes the impeder will degrade over time, sometimes the effect will be more dramatic. There may be no indication that something in the weld area has changed until the operator notices a change in the appearance of the weld. If the failure is gradual, the operator may not notice the decreased weld temperature for quite a while. Even if the change is substantial, the operator could be occupied by one of the other tasks that he or she is responsible for and not notice the change right away.

The impeder is one example of a potential issue that could affect weld temperature but there are many others. Any decrease from the optimal welding temperature degrades the quality of the weld. An increase in temperature will at the very least decrease efficiency, but it could negatively affect weld quality as well. Commercial products are available currently that attempt to improve on the status quo approach, which relies on operator judgment. These products, however, have not yet been successful at even duplicating the accuracy of a mill operator.

U.S. Pat. No. 10,024,735 B2, titled "Heat Energy Sensing and Analysis for Welding Processes," presents a representative system to automate this task. The system uses an infrared radiation (IR) camera in an attempt to measure the temperature of the weld. Using an IR camera seems intuitively to be a good solution to this problem which is why it is a common approach to solving it. IR cameras and detectors are often used to measure temperature. There are, however, characteristics about a tube mill that greatly hamper the efficacy of IR measurements.

The first issue with using IR-based measurements is that radiation at the wavelength detected by IR sensors is absorbed very efficiently by water. In fact, the absorption coefficient for IR radiation in water is about ten thousand times higher than for visible light, meaning that in an environment with water present only a small fraction of the emitted IR radiation will reach the detector. The ambient environment around the weld point of a tube mill is full of water. Water is constantly sprayed onto the tube and its surroundings to keep the working temperature as cool as possible everywhere other than the weld point. The field of view that includes the weld nearly always passes through a layer of steam and may even be obstructed by liquid water.

If the only issue was that IR is absorbed by water, then a solution to the above problems would be fairly straightforward. A different wavelength, either near IR or even red light, could be used instead. This would work if the viewing path, although obstructed, passed through a consistent environment. That is not the case, however. The ambient environment is constantly changing as cooling lines are moved, the water temperature or pressure changes, or any of the other parameters concerning the weld area are modified. An operator's view could be obstructed by primarily steam at one point, but then equal parts steam and smoke the next. Or, an operator might move a cooling tube to address an overheating roller and suddenly produce a much clearer view of the weld than there was a moment before. With only a single wavelength to work with it would be impossible to determine if an increase in signal intensity resulted from fewer obstructions or from a temperature increase.

The advantage of using more than one wavelength comes from a basic algebraic principle, that with only one equation you can only solve for one unknown variable. Systems that typically measure temperature using IR assume that ambient conditions in the viewing window will be relatively constant. In that case a single wavelength, yielding a single equation, is enough to solve for the single unknown: temperature. When additional variables are introduced, such as the amount of radiated energy absorbed before reaching the sensor, additional equations need to be introduced. This can be done by measuring additional distinct wavelengths. Ratio pyrometers take advantage of this by taking measurements at two distinct IR wavelengths to allow for temperature measurements in smoky environments, or through a viewing window that is difficult to keep clean.

An illustrative example of the advantage gained by a second wavelength is shown in FIGS. 1A and 1B. Both FIGS. 1A and 1B illustrate an analysis of the same 300 frames of video taken of a heated nichrome wire. In the first third of the frames, the temperature of the wire is around 900° C. The temperature is around 50° C. hotter in the middle third, and 100° C. hotter in the final third. White regions of the graph indicate areas where there is no water vapor present and the view from the viewing window is unobstructed. In the yellow regions, water vapor is present in the viewing window. In the red regions, even more water vapor is present. FIG. 1A shows the discernable information about the temperature of the wire if using only a red light signal. Compared to the case without water vapor, the relative intensity of the detected red light (relative to the peak value from all 300 frames) is dramatically lower when any water vapor is present. The intensity is lower at 1000° C. with high amounts of vapor present than for a clear view 100° C. cooler. The results would be significantly lower for IR, which is absorbed by water around 10,000 times more efficiently than red light. The plot in FIG. 1B is quite different. Regardless of how much vapor exists, the ratio between the red light intensity and blue light intensity depends almost entirely on the temperature of the wire. As will be explained below, the plotted signal is not simply the ratio between the red and blue light waves, but rather, incorporates other information as well.

Another characteristic of IR may at first glance appear to be helpful but actually turns out to be problematic in this instance. It might seem beneficial that IR refracts and scatters much less than visible light. An IR image will become darker or lighter as the amount of steam and smoke obstructing the view changes, but little else about the image will change. In this case it would actually be helpful if attenuation due to ambient environmental conditions other than temperature also altered the profile of the received signal. Instead, decreasing the temperature of the weld or increasing the amount of steam around the weld will yield very similar images. As a result, there is little information to gather from the IR image to help decipher what is actually occurring at the weld.

To overcome these and other difficulties there is a need for a method and system that enables the reliable and repeatable measurement of temperature in a welding environment.

BRIEF SUMMARY OF THE DISCLOSURE

Despite the complexities of the welding environment, the nature of induction welding presents a unique opportunity upon which this disclosure capitalizes. In certain situations, such as heating a furnace or kiln, determining the precise value of the temperature being measured is of the utmost importance. In the case of induction welding, the key is to take a repeatable measurement. Each mill runs a different metal formulation and mill operators are not typically aware of all the characteristics of a specific formulation for all temperatures. For example, mill operators are generally not concerned with the emissivity of their product at different temperatures. An operator generally knows from personal experience what color the particular metal formulation of their workpiece will glow when a good-quality weld is being made and will adjust the welder power to keep the weld point glowing at this color.

In order to account for the wide range of possible viewing environments, multiple wavelengths need to be measured at the same time, and a visible light camera is designed to do just that. Previous temperature measurement solutions have focused on measuring changes in weld radiation intensity at a single wavelength. This disclosure not only uses multiple wavelengths, but also the radiation pattern produced by each wavelength.

As a metal is heated it typically begins to glow red first, then progresses to yellow, white and eventually blue as it gets hotter. The exact color will vary for different metal formulations with different emissivities but that does not present any problems for the method and system of this disclosure. A goal of the disclosure is to achieve repeatable measurements, and a metal with a specific formulation will always glow the same color when heated to the same temperature. By measuring the ratios between detected levels of red, blue, and green light, an embodiment according to this disclosure measures and reports a temperature based on the color of the weld, rather than on the IR heat intensity. An increase in smoke density may dim the image of the weld but will not have a significant effect on the ratio of red to blue light.

There are some differences in how red, green, and blue light respond to different environmental factors. In order to account for these variations, the characteristic shapes of components of different colors are compared. For example, a tube mill has a consistent shape. The glowing hot edges of a metal strip being rolled together to fabricate a tube form the shape of a letter 'V' with the vertex of the 'V' being the weld point. FIG. 2 illustrates this V-shape. Both sides of the 'V' appear as straight narrow lines showing the hot edges. By measuring the variation between the profile of the colors across these lines, the characteristics of the ambient environment can be determined. For instance, knowing that blue light is more prone to scattering and refraction than red light and that red light is absorbed more efficiently in water will lead to inferences that can be made about the weld conditions. Measuring the dispersion of red and blue lines compared to one another will provide even more insight into how the signal is being affected, what the ambient environment is composed of, and what the weld temperature is. In addition to operating in the visible light range rather than IR, the ability to measure and account for variations in color profiles at distinct wavelengths is the main feature that distinguishes the system disclosed herein from a ratio pyrometer. The disclosed system also improves on a pyrometer by being able to find the hottest visible part of the weld automatically through image processing, while a pyrometer simply reads the temperature of the spot at which it is pointed. During tube mill operation, the exact location of the workpiece will vary over time. While this variation in location is not sufficient to move the weld area out of the camera's field of view, it would be enough to shift the weld area out of a mounted pyrometer's narrow field of view.

Exemplary embodiments of this disclosure use a visible light camera and visible light filters to collect information about the weld at three distinct wavelengths. Each of these wavelengths is not only distinct but also responds to environmental factors differently. Embodiments of this disclosure use all that information to solve for the color of the weld. A mill operator, for example, may use such an embodiment to test his or her material formulation to learn the correspondence between a particular color and the temperature of that material which depends on its emissivity. Once a mill operator knows what color produces a product with desired weld quality, the operator may use the method and system disclosed herein to repeat and maintain that color and the associated temperature.

BRIEF DESCRIPTION OF THE DRAWINGS

The features and advantages of this disclosure will be more fully understood with reference to the following, more detailed description, when taken in conjunction with the accompanying figures.

DETAILED DESCRIPTION

Reference will now be made in detail to describe exemplary embodiments of this disclosure in conjunction with the accompanying figures. Specific details disclosed herein are not to be interpreted as limiting, but rather as a basis for the claims and teaching one skilled in the art how the present invention could be employed in any appropriately detailed system, structure or manner.

Figure 2:
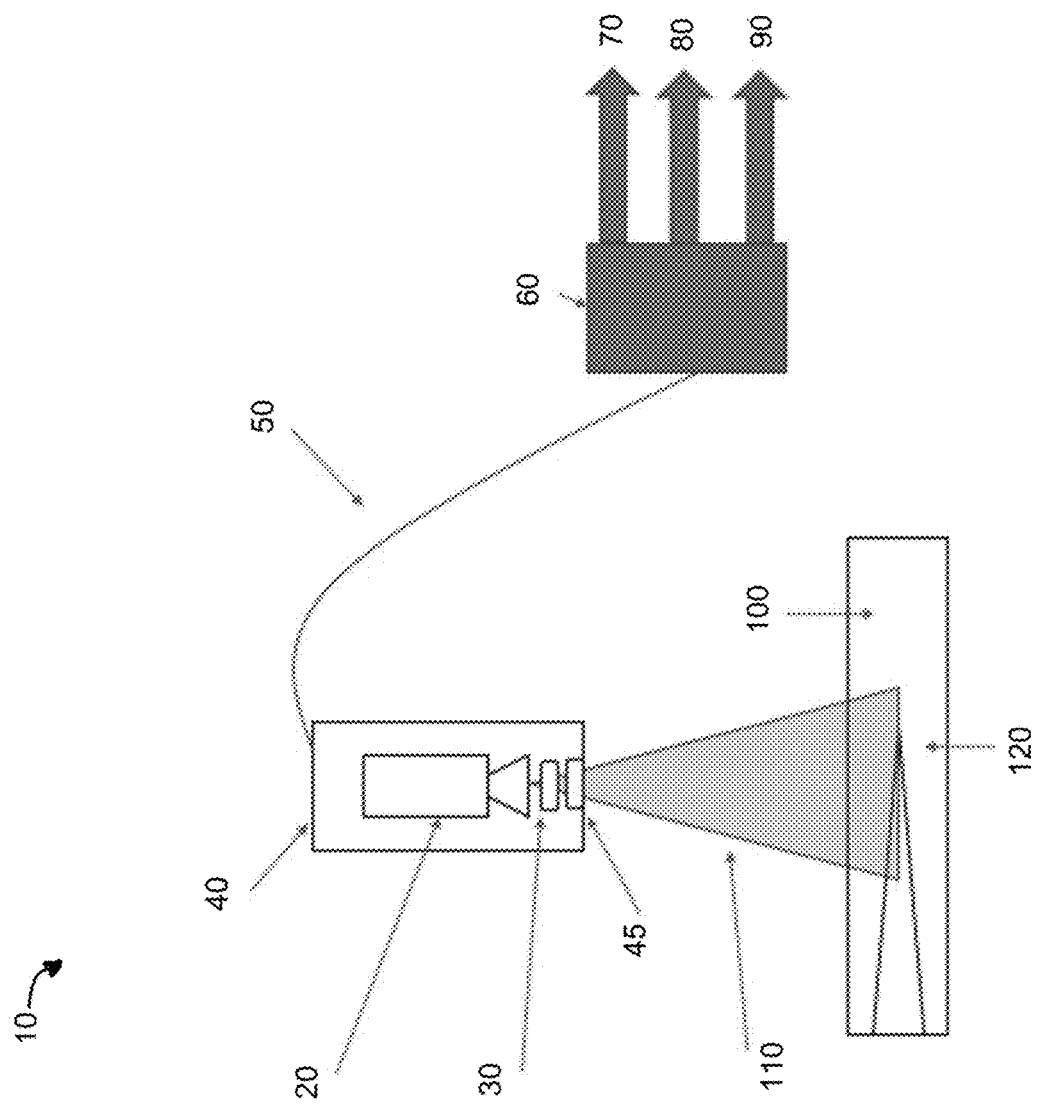
FIG. 2 illustrates exemplary components of an embodiment, in accordance with the disclosure, mounted over a welding point on a tube mill.

As illustrated in FIG. 2, a vision system 10 includes a camera 20 equipped with a light sensor (not shown) that is capable of detecting multiple distinct wavelengths, a filter or series of filters 30, and an enclosure 40 with a viewing window 45 that is transparent to the wavelengths being measured. In this embodiment, the viewing window 45 of the enclosure 40 is disposed at a distance from a metal tube 100 workpiece such that the camera 40 is provided with a field of view 110 that includes a weld point 120 of the metal tube 100. The weld point 120 corresponds to the vertex of the V-shape in the metal tube fabrication process as described above. The filters 30 are used to modify the incoming signal in accordance with the needs of the application. These needs may be dictated by the camera specifications or by the weld environment. For instance, red, green and blue pixels in a common visible light sensor have the same sensitivity to light wavelengths in the range from 800 nm to 1000 nm. The inability to differentiate sensor levels in this range would impair the precision of calculations to identify color, and therefore, in some embodiments, a filter that cuts off light above 800 nm may be introduced. In another embodiment, if an ideal weld emits a light color closer to red than white, the camera may struggle to collect a sufficient quantity of either red or blue light. A weld that is glowing red will emit much more red light than blue light. Adjusting the aperture and shutter speed of the camera based on the amount of blue light radiation would overexpose the red light sensors. Conversely, adjusting the aperture and shutter speed based on the amount of red light radiation would underexpose the blue light sensors. In such a situation, a filter that attenuates red light while allowing blue light to pass through could be used to bring the intensities into alignment such that the camera aperture and shutter speed could be set to properly expose both blue and red sensors within their respective dynamic ranges.

The enclosure 40 surrounds the camera 20 and protects it from water, steam, and smoke present in the weld area. Depending on the positioning of the camera 20 and the ambient temperature, a means for cooling the camera may be introduced.

Light wavelength intensity data collected by the camera 20 is transmitted via a cable 50 to a computing element such as a computer 60 for data analysis. In other embodiments, the transmission of data from the camera 20 to the computer 60 may be accomplished via a computer network or by wireless communication.

In certain other embodiments, depending on the quantity and intensity of data analysis needed, an FPGA (Field Programmable Gate Array) (not shown) may be used to implement a data processing algorithm. This FPGA may be internal or external to the computer 60. Use of an FPGA may be called for in applications where multiple characteristics associated with the image shape are analyzed simultaneously. In other embodiments, a simplified version without an FPGA is also possible where perhaps only the intensities of two wavelengths of light are used to give a sufficient approximation of the temperature. The processing needs will ultimately be determined by two main factors. The first is the degree of volatility in the weld environment for a given mill. A mill where the view of the weld is kept clear and rarely changes would find a simple ratio of red to blue light intensity provides the required accuracy. The only image processing needed would be to determine the hottest part of the tube. A mill with more variables and water and smoke covering the weld likely will need image processing to supplement the ratio measurements, resulting in the need for more computing power. The second factor depends on how the mill operator wants to deploy this system. If all that is desired is an alarm that alerts the operator when their impeder is cracked, a simple ratio of red to blue light intensity would suffice. On the other hand, if the operator wants to use this system to monitor their process control and to guide changes they make, then it would likely be desired to incorporate image processing.

The computer 60 may also be equipped with a memory that stores color and temperature measurement records. In addition to calculating the weld color and temperature, the computer 60 outputs a display signal 70 of a running plot showing how the measured color corresponds to temperature, either for the particular material formulation being analyzed or for a representative formulation. The computer 60 is also provided with a user interface via which an operator can enter an optimal or desired weld color and a range of acceptable variation. The user interface may be configured as a touch screen or other input device and may be provided at the computer 60 or located a distance away, such as within easy access by the weld operator. When the sensed color or corresponding temperature changes by an amount greater than the preset operator determined value, the computer 60 outputs an alert 80 to the operator. The outputted alert 80 may be visual, auditory, or electrical, allowing the operator to use that information to respond in an appropriate manner. The computer 60 also outputs color data in real time 90.

In some embodiments the computer 60 may additionally perform image processing to determine a region containing the hottest part within the field of view, which would be the weld point, and to calculate and output temperature information for that region only.

Figure 1A:
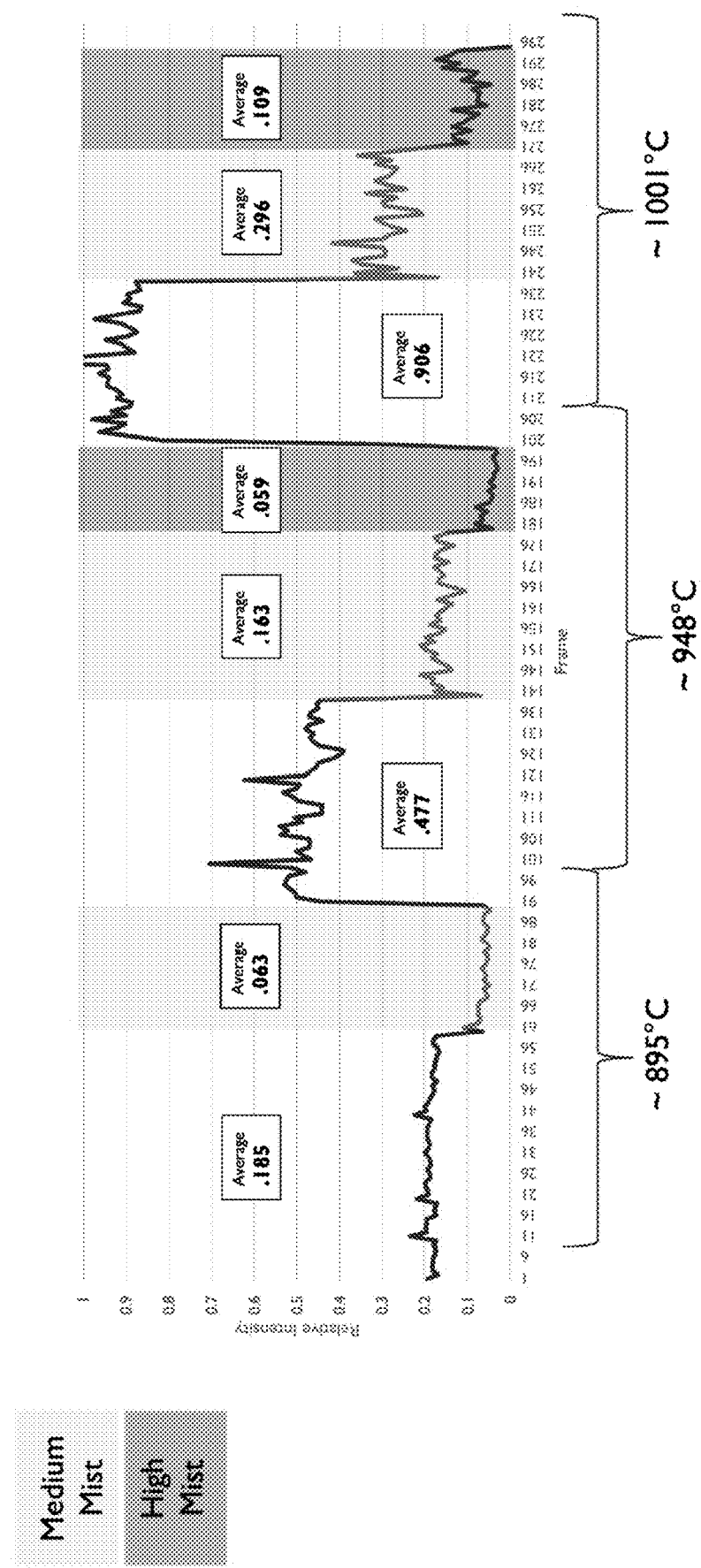
FIG. 1A is a graph showing the relative intensity of red light as detected by a camera under conditions where different levels of ambient water vapor obstruct the view of a wire heated by resistive heating.
Figure 1B:
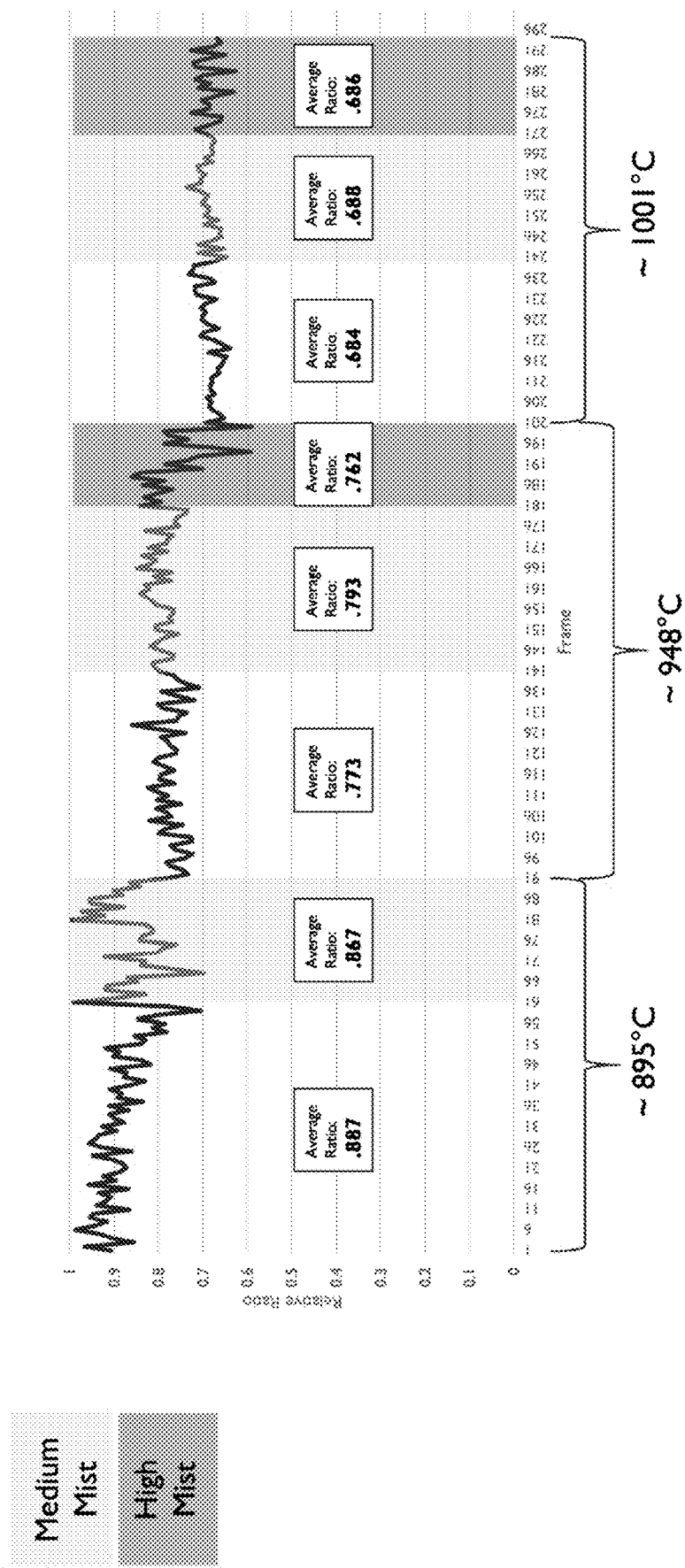
FIG. 1B is a graph showing the modified relative ratio of red to blue light as detected by a camera under conditions where different levels of ambient water vapor obstruct the view of a wire heated by resistive heating.

FIG. 1B illustrates an example of how an algorithm could be implemented that uses information from multiple wavelengths of light along with image processing to give a consistent reading that depends on temperature alone. The modified ratio plotted on the vertical axis of the graph of FIG. 1B takes four separate factors into account, only one of which would be available in a single wavelength IR system. The first two factors, as discussed above, are the respective intensities of the blue and red light signals. FIG. 1B additionally accounts for how sharply the red and blue images fall from their peak values to a background level. Under conditions where there is a clear view of the wire, the two colors would exhibit nearly identical profiles. As more vapor is introduced the blue profile will spread out more quickly than the red. Combining the ratio between the two color intensities with the ratio between the distance each color shows from peak value to half its peak, a number can be found that consistently corresponds to the temperature of the observed work piece without being affected by variations in the ambient environment. In contradistinction, an IR system has a single wavelength intensity and virtually no image variation to interpret, to say nothing of how little signal will actually pass through even a moderate amount of water vapor.

Use Example

A tube mill operator may use an embodiment of this disclosure to maintain the optimal weld temperature for specific material. After establishing the ideal weld color, through testing or experience, the operator enters into the computer, via a user interface, the color of an optimal weld, as well as acceptable variations. What the operator deems acceptable will depend on how they are using the system and what type of product they are producing. If the system is being used to watch for major events like a broken impeder or a malfunction in the welder, then the variation may be set to about ±10% and still capture what they are looking for. Setting the variation to about ±1 to 2% of the desired temperature would be preferable if the operator is producing product with more rigid requirements. The disclosed system then monitors the weld color, logs the measured color information, and notifies the operator when an unacceptable deviation in color or associated temperature is detected. The system calculates color within its field of view by using the available distinct wavelengths that it can sense. The intensity and profile of each distinct wavelength is measured. For instance, in a visible light system with only red and blue light available, the intensities of those two wavelengths can be compared. The shape of the two colors observed across the strip edges will also be compared. Characteristics of these shapes, such as the steepness of the observed drop in temperature at the strip edge for each observed wavelength, will be used to improve the accuracy of the measurement. In the case where the blue light profile at the strip edge changes to become more gradual at a faster rate than the red light profile, it can be deduced that more steam or smoke is obstructing the view. This is because blue light scatters and is refracted more readily than red light. Any of these characteristics may be accessed by the operator.

Through using an embodiment of the highly accurate temperature measurement method and system disclosed herein the mill operator will be able to fabricate a higher quality product and a more efficient production process. In the event that an issue arises with product quality, the mill operator will be able to retrieve records of prior temperature measurements and will be positioned to understand what went wrong and what corrective action can be taken.

While specific embodiments of the disclosed subject matter have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the claims appended and any and all equivalents thereof.

What is claimed is:

1. A temperature sensing device comprising:
    a camera equipped with a lens and a sensor, the sensor configured to sense electromagnetic radiation at a plurality of distinct wavelengths; and
    a computing element connected to the camera,
wherein the camera transmits color radiation intensity information sensed at each of the plurality of distinct wavelengths of a weld area to the computing element and the computing element uses the ratio of the radiation intensity information at the plurality of distinct wavelengths to calculate a corresponding temperature value.

2. The temperature sensing device of claim 1 additionally comprising a camera enclosure that surrounds the camera, the enclosure provided with a viewing window, wherein the camera lens is aligned with the viewing window such that the camera is provided with a field of view that includes the weld area.

3. The temperature sensing device of claim 2, wherein the camera is provided with a filter, the filter disposed between the camera lens and the viewing window.

4. The temperature sensing device of claim 2, wherein the computing element generates an alert to an operator when the calculated temperature changes by an amount greater than a preset operator-determined value.

5. The temperature sensing device of claim 3, wherein the computing element includes an FPGA.

6. The temperature sensing device of claim 3, wherein the plurality of distinct wavelengths of electromagnetic radiation includes at least one visible light wavelength.

7. The temperature sensing device of claim 6, wherein the weld point is a weld point in a resistive welding process.

8. A temperature sensing system for a resistive welding process for a tube, the system comprising:
    a camera equipped with a lens and a sensor, the sensor configured to sense electromagnetic radiation at a plurality of distinct wavelengths;
    a camera enclosure that surrounds the camera, the enclosure provided with a viewing window, wherein the camera lens is aligned with the viewing window such that the camera is provided with a field of view that includes a V-shaped weld process area of a metal strip; and
    a computing element connected to the camera,
wherein the camera transmits radiation intensity information sensed at each of the plurality of distinct wavelengths of the weld process area to the computing element and the computing element uses the ratio of the radiation intensity information at the plurality of distinct wavelengths to calculate a corresponding temperature value.

9. The temperature sensing system of claim 8, wherein the computing element is configured to perform image processing to identify the hottest region within the field of view and to calculate temperature value information for that region.

10. A method for determining the temperature of a weld comprising the steps of:
    entering a desired color of a weld and an acceptable range of variation via a user interface to computing element;
    sensing distinct light wavelengths emitted from a weld within a field of view;
    calculating a color based on the sensed distinct wavelengths,
    monitoring and logging the calculated color; and
    generating an alert when a deviation greater than the acceptable range of variation in color is detected.

11. The method of claim 10 further comprising the step of performing image processing to identify the hottest region within the field of view and to calculate temperature information for that region.

12. The method of claim 10 wherein the weld is formed in a resistive welding process for a tube.

13. The temperature sensing system of claim 8, wherein the plurality of distinct wavelengths of electromagnetic radiation includes at least one visible light wavelength.

* * * * *